United States Patent Office 3,183,148
Patented May 11, 1965

3,183,148
COMBATING NEMATODES WITH CARBAMATE HETERO-SULFUR COMPOUNDS
Donald S. Cannon, Blawenburg, and Roger Williams Addor, Pennington, N.J., assignors to American Cyanamid Company, Stamford, Conn., a corporation of Maine
No Drawing. Filed Sept. 20, 1962, Ser. No. 225,137
6 Claims. (Cl. 167—33)

The present invention relates to the control of nematodes and other parasitic worm life. More particularly, the invention relates to a class of carbamates of heterocyclic sulfur moieties containing from five to six atoms, and has for its principal object the utilization of such carbamates as the active component in controlling nematodes and other parasitic worm life at any stage of their life cycle.

Nematocidal carbamate hetero-sulfur compounds prepared in accordance with the present invention may be represented by the general formula:

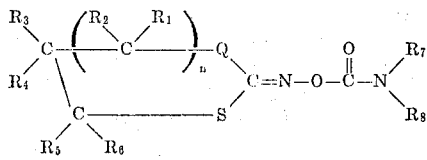

wherein $R_1$, $R_2$, $R_3$, $R_4$, $R_5$, $R_6$, $R_7$ and $R_8$ are hydrogen and lower alkyl which may be the same or different, $n$ is an integer from 0 to 1, and Q represents either a sulfur or oxygen atom.

In general, the compounds of the present invention may be prepared by a number of diverse processes. Illustrative of one such process involves the reaction between (1) either a 2-oximino derivative of the heterocyclic sulfur moiety or the corresponding alkali metal salt thereof, and (2) either an isocyanate or a carbamyl halide. Each reactant is advantageously present in equimolar amounts at temperatures ranging from about 0° C. to about 100° C. The over-all reaction may be represented as:

[I]

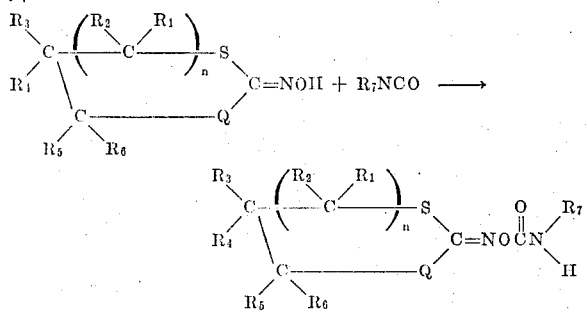

and

[Ia]

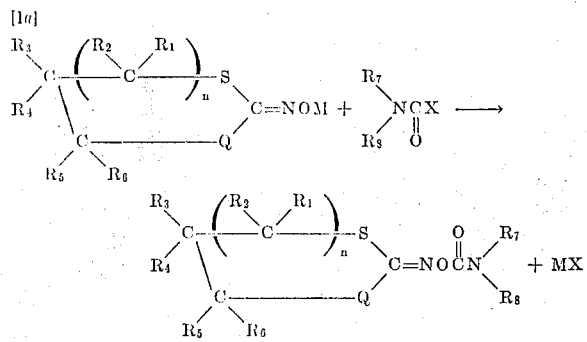

wherein $R_1$, $R_2$, $R_3$, $R_4$ and $n$ represent the same values as above; $R_5$ and $R_6$ represent a lower alkyl radical; $R_7$ and $R_8$ represent hydrogen or lower alkyl and may be the same or different; M is an alkali metal, such as sodium potassium or lithium; and X is a halogen atom, such as fluoro, chloro, bromo or iodo.

Alternatively, the carbamates employed in the present invention can be prepared by the reaction between 2-oximino heterocyclic sulfur compounds or the corresponding alkali metal salts thereof, and phosgene, followed by further reaction with either ammonia, a primary amine or a secondary amine in accordance with the following over-all reactions:

[A]

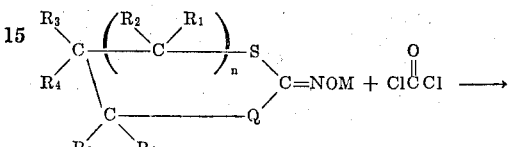

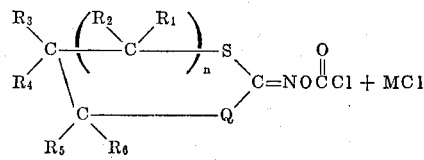

and

[B]

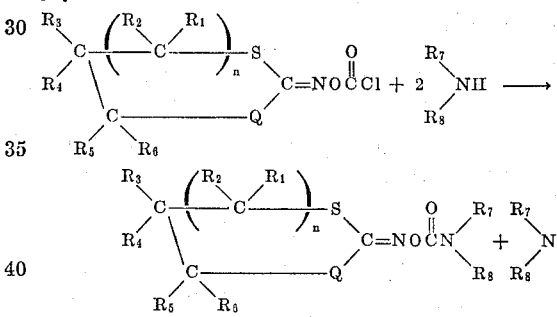

wherein $R_1$, $R_2$, $R_3$, $R_4$, $R_5$, $R_6$, $R_7$, $R_8$, Q and $n$ all represent the same values as above.

It is an advantage of the present invention that a large number of alkyl isocyanates and carbamyl halides may be employed in hereinabove defined reactions [I] or [Ia]. Such illustrative but non-limitative reactants include, for instance, methyl isocyanate, ethyl isocyanate, propyl isocyanate, t-butyl isocyanate, n-pentyl isocyanate, n-hexyl isocyanate and heptyl isocyanate as well as carbamyl chloride, N,N-dimethyl carbamyl, N,N-diethyl carbamyl bromide, N,N-dipropylcarbamyl chloride and N,N-dibutyl carbamyl iodide.

In the above reaction designated as [B], ammonia and a variety of alkyl amines can advantageously be employed. Exemplary amines are: methylamine, ethylamine, propylamine, butylamine, dimethylamine, diethylamine, dipropylamine, dibutylamine, diamylamine, dihexylamine, homologs and isomers thereof.

The heterocyclic reactants possessing the desired 2-oximino substituent can be prepared from a variety of heterocyclic compounds which include:

2-imino-1,3-dithiolane,
2-imino-1,3-oxathiolane,
2-imino-1,3-dithiane,
2-imino-1,3-oxathiane,
2-methylimino-1,3-dithiolane,
2-ethylimino-1,3-oxathiolane,
2-n-propylimino-1,3-dithiane,
2-n-butylimino-1,3-oxathiane, as well as the ring-substituted lower alkyl derivatives thereof.

In general, a 2-imino heterocyclic sulfur reactant can initially be conveniently prepared in a straightforward manner by bringing into reactive combination approximately equimolar amounts of a cyanogen halide and ethanedithiol-1,2, 1-hydroxy-2-mercapto-ethane, propanedithiol-1,2, propanedithiol-1,3, 1-mercapto-3-hydroxy-propane, 1,3-dithiol-2-methyl-n-propane, butanedithiol-1,2, or 2,5-dimethylhexanedithiol-3,4, homologs and isomers thereof, preferably in the presence of an acidified alcoholic catalyst, such as hydrogen chloride-ethanol mixture when utilizing a dithiol as the reactant. However, a 2-alkylimino hetero-sulfur compound can be prepared by reacting a lower alkyl ammonium alkyldithiocarbamate salt and an alkylene dihalide, such as ethylene bromide, ethylene chloride, 1,2-dibromopropane, 1,3-diiodopropane and 1,3-dichloropropane. Resultant 2-iminohetero-S hydrohalide or 2-alkylimino-hetero-S hydrohalide can be reacted next with an hydroxylamine salt, such as either hydroxylamine hydrohalide or hydroxylamine sulfate, to obtain 2-oximino-hetero-sulfur derivatives which are utilized as reactants herein.

In order to facilitate a further understanding of the present invention, the following illustrative examples are presented. These are not to be taken as limitative of the invention. Unless otherwise stated, the parts are by weight.

EXAMPLE 1

*Preparation of 2-imino-1,3-dithiolane hydrochloride*

To a mixture of 25.0 parts of ethanedithiol in 125 parts (by volume) of dry acetonitrile at 0° C.–5° C. in a vessel equipped with a condenser, are added 17.2 parts of cyanogen chloride over a thirty-minute period. After stirring at 35° C.–40° C. for four hours, the mixture remains at room temperature overnight. The product is collected as colorless needles weighing 27.3 parts, corresponding to a yield of 66.2 percent of theory, and melting at 218° C.–220° C. with decomposition.

Analysis for $C_3H_6NClS_2$—Calculated: Cl, 22.8%. Found: Cl, 22.6%.

In the foregoing, similar results are obtained where cyanogen bromide is substituted for cyanogen chloride.

EXAMPLE 2

*Preparation of 2-imino-1,3-oxathiolane hydrochloride*

A mixture of 50 parts of mercaptoethanol in 200 parts of benzene in a flask equipped with a stirrer, ice-water-cooled condenser, gas inlet tube and thermometer is heated to 50° C. and 44 parts of a gaseous cyanogen chloride are passed in over a two and one-half hour period. The temperature rises spontaneously to 60° C.–65° C. when about half of the cyanogen chloride is added, solids begin forming, and the temperature stays at this level during the remainder of the addition period. After the mixture has been maintained at 40° C.–45° C. for an additional four and one-half hours and stayed overnight at room temperature, the solid 2-imino-1,3-oxathiolane hydrochloride amounting to 47 parts, or 52 percent of theory, is collected.

EXAMPLE 3

*Preparation of 2-imino-5-methyl-1,3-oxathiolane hydrochloride*

Example 1 above is repeated in every detail, except that 1-hydroxy-2-mercapto-n-propane is substituted for the ethanedithiol reactant therein. Resultant product, 2-imino-5-methyl-1,3-oxathiolane, is obtained in good yield and purity.

EXAMPLE 4

*Preparation of 2-isopropylimino-1,3-dithiolane*

To a stirred mixture of 10.0 parts of ethylene bromide and 8.8 parts of potassium carbonate in 75 parts of absolute ethanol at 38° C.–40° C. are added 10.4 parts of isopropylamino ammonium isopropyldithiocarbamate in small increments over a one-hour period. After heating to reflux for ten minutes, the mixture is cooled, resultant solids are filtered off, and the alcohol solution diluted with about three volumes of water. Extraction of the aqueous mixture with ether followed by stripping off the ether and distillation of the residue affords 6.5 parts or 76 percent of theory of 2-isopropylimino-1,3-dithiolane having a boiling point of 81° C.–83° C./0.30 mm. Hg and a refractive index ($n_D^{25}$) of 1.5671.

Analysis for $C_6H_{11}NS_2$—Calculated: C, 44.68; H, 6.88; S, 39.76. Found: C, 44.82; H, 7.09; S, 39.85.

EXAMPLE 5

*Preparation of 4-methyl-2-methylimino-1,3-dithiolane*

To a stirred mixture of 99.7 parts of 1,2-di-bromopropane in 300 parts of ethanol at 40° C. are added 65.9 parts of methylamino ammonium methyldithiocarbamate over a period of one hour. After heating for an additional hour at 50° C., the mixture is cooled, 300 parts of ether and one equivalent of sodium hydroxide are added, and the organic phase separated. The organic phase is dried with magnesium sulfate and the solvent stripped. Distillation of the residue yields 15.9 parts of desired product as 22.8 parts of unreacted dibromopropane. A sample of the product on redistillation boils at 54° C./0.04 mm. Hg, refractive index ($n_D^{25}$) equal to 1.5781.

Analysis for $C_5H_9NS_2$—Calculated: C, 40.78; H, 6.16; S, 43.55. Found: C, 40.94; H, 6.17; S, 43.52.

EXAMPLE 6

*Preparation of 2-imino-1,3-dithiane hydrochloride*

To a mixture of 130 parts of chloroform nearly saturated with dry hydrogen chloride in a flask equipped with a stirrer, ice-water-cooled condenser, gas inlet tube and thermometer are added 27.7 parts of propane-1,3-dithiol. Subsequent slow addition of 18 parts of gaseous cyanogen chloride over a two-hour period causes a spontaneous temperature rise to 42° C. After completion of cyanogen chloride addition, the mixture is heated at 50° C.–55° C. for one hour. The crystalline product amounts to 24.1 parts or 55.5 percent of theory. The sample is sublimed at 95° C.–100° C./0.5 mm. Hg for analysis. It melts with darkening at 155° C.–160° C.

Calculated for $C_4H_8ClNS_2$: C, 28.31; H, 4.75; Cl, 20.89. Found: C, 27.99; H, 5.18; Cl, 20.89.

EXAMPLE 7

*Preparation of 2-oximino-1,3-dithiolane*

A mixture of 0.21 part of 2-isopropylimino-1,3-dithiolane obtained in Example 4 above, and 0.10 part of hydroxylamine hydrochloride is heated on the steam bath with 3.0 parts of water and sufficient ethanol to initially dissolve the reactants. After two hours, most of the ethanol has boiled away and, on ice-cooling the remaining mixture, the product crystallizes. The water is decanted off and the solids are rinsed with water and vacuum-dried. The 2-oximino-1,3-dithiolane, melting point 124° C.–127° C., weighs 0.14 part or 80 percent of theory.

EXAMPLE 8

*Preparation of 2-oximino-1,3-dithiolane*

A mixture consisting of 55.0 parts of 2-imino-1,3-dithiolane hydrochloride obtained in Example 1 above, 27.1 parts of hydroxylamine hydrochloride and 34.8 parts of sodium acetate is mixed at 70° C.–75° C. for one hour. Crystallization of the resultant oxime occurs. After cooling to room temperature and filtering, a 87.6 percent yield of colorless 2-oximino-1,3-dithiolane is obtained, melting at 126° C.–128.2° C.

EXAMPLE 9

*Preparation of 2-oximino-1,3-oxathiolane*

To a mixture of 19.0 parts of 2-imino-1,3-oxathiolane hydrochloride and 10.4 parts of hydroxylamine hydrochloride in 75 parts of water are added 12.3 parts of solid sodium acetate in increments over a two-hour period. After twenty-four hours, 12.5 parts of solid sodium bicarbonate are added slowly. The mixture is filtered, the filtrate is diluted with an equal volume of a saturated salt solution, and the mixture is continuously ether extracted for fourteen hours. The semi-solid residue obtained by evaporation of the ether is extracted several times with hot benzene. The benzene on dilution with hexane gives several fractions of solids which are combined. Recrystallization from benzene plus a small quantity of hexane affords 5.2 parts of 32 percent of theory of 2-oximino-1,3-oxathiolane having a melting point of 111° C.–116° C. Sample recrystallized further melts at 116.4° C.–117.2° C.

Analysis for $C_3H_5NO_2S$—Calculated: C, 30.24; H, 4.23; N, 11.76; S, 26.91. Found: C, 30.29; H, 4.24; N, 11.76; S, 26.96.

EXAMPLE 10

*Preparation of 4-methyl-2-oximino-1,3-dithiolane*

A solution of 10.0 parts of 4-methyl-2-methyl-imino-1,3-dithiolane and 5.2 parts of hydroxylamine hydrochloride in 80 parts of 40% ethanol is heated on a steam bath for four hours. The yellow oily product obtained after extracting the reaction mixture with ether, treating the ether solution with activated carbon and magnesium sulfate, and stripping off the ether, amounts to 9.1 parts or 90 percent of theory. The infrared spectrum shows the expected $>C=N-$ band absorption at 1600 cm.$^{-1}$.

EXAMPLE 11

*Preparation of 2-oximino-1,3-dithiane*

A mixture of 18.0 parts of 2-imino-1,3-dithiane hydrochloride, 8.1 parts of hydroxylamine hydrochloride, and 9.6 parts of sodium acetate in 200 parts of water is slowly heated to 64° C. over a one-hour period and then to 75° C. over the next fifteen minutes. After cooling the mixture, extraction with ether in the usual manner affords 11.6 parts of product as an oil which soon crystallizes. Recrystallization from a benzene-hexane mixture gives 8.9 parts of the oxime, melting point 92.4° C.–94.8° C. A small sample recrystallized once again for analysis melts at 94.0° C.–95.0° C.

Calculated for $C_4H_7NOS_2$: C, 32.19; H, 4.73; N, 9.39; S, 42.97. Found: C, 32.11; H, 4.86; N, 9.30; S, 42.98.

EXAMPLE 12

*Preparation of 2-oximino-5-methyl-1,3-oxathiolane*

To an agitated mixture of 100.0 parts of 2-imino-5-methyl-1,3-oxathiolane hydrochloride and 45.3 parts of hydroxylamine hydrochloride in 200 parts of dry methanol are added in increments at room temperature over a one-hour period 53.4 parts of sodium acetate. After stirring the mixture at room temperature overnight, it is heated at 50° C. for two hours and then cooled. There are then added 66 parts of potassium bicarbonate and 200 parts of ether followed by stirring for two hours, and the reaction mixture is then filtered. The filtrate is concentrated. Extraction of the residue successively with benzene and ether, followed by concentration of the ether-benzene mixture, yields 56.9 parts of crude product. The oil remaining from the benzene-ether extraction is mixed with methanol and 200 parts of chloroform and the mixture is washed successively with partially saturated salt solution and with a saturated salt solution. After filtering through magnesium sulfate, concentration of the chloroform mixture leaves another 23.0 parts of crude oxime. Recrystallization of the combined crude oxime from a 1:1 benzene-ether mixture gives 40.0 parts or 46.2 percent of theory of product, having a melting point equal to 92° C.–94° C. A sample, vacuum sublimed for analysis, melts at 94.0° C. to 95.2° C.

Calculated for $C_4H_7NO_2S$: C, 36.07; H, 5.30; N, 10.52; S, 24.08. Found: C, 36.27; H, 5.45; N, 10.56; S, 24.21.

EXAMPLE 13

*Preparation of 4,5-dimethyl-2-oximino-1,3-dithiolane*

A mixture of 15.0 parts of 4,5-dimethyl-2-imino-1,3-dithiolane hydrochloride, 6.3 parts of hydroxylamine hydrochloride, and 7.8 parts of sodium acetate in 115 parts of water are stirred and heated at 75° C.–80° C. for one hour. The solids which form on ice-cooling the mixture, are collected, washed with water and allowed to dry. Recrystallization from benzene-hexane affords 10.1 parts, or 75.6 percent of theory, of colorless product melting at 100° C.–103° C.

Analysis for $C_5H_9NOS_2$—Calculated: C, 36.78; H, 4.38; N, 8.58; S, 39.27. Found: C, 37.33; H, 4.43; N, 8.57; S, 39.37.

EXAMPLE 14

*Preparation of 4-n-butyl-2-oximino-1,3-dithiolane*

A mixture of 13.0 parts of 4-n-butyl-2-imino-1,3-dithiolane hydrochloride, 4.7 parts of hydroxylamine hydrochloride, and 5.8 parts of sodium acetate is stirred and heated at 70° C.–80° C. for two hours. On cooling, a viscous oil separates. The water is decanted away from the oil and the oil taken up with ether and dried by filtration through magnesium sulfate. Evaporation of the ether gives 10.7 parts, or 91.8 percent of theory, of the oxime. The infrared absorption curve of the oxime shows bands at 950 cm.$^{-1}$ and 1580 cm.$^{-1}$ attributable to the $=N-O$ and $=C=N-$ bonds, respectively, and several bands in the 2800 cm.$^{-1}$ and 3300 cm.$^{-1}$ region assignable to the $-OH$ function.

EXAMPLE 15

*Preparation of N-methyl carbamate of 2-oximino-1,3-dithiolane*

To 5.3 parts of 2-oximino-1,3-dithiolane dissolved partially in 20 parts of dry ether in a suitable ice-cooled reaction flask are added 2.5 parts (by volume) of methyl isocyanate and 0.1 part of triethylamine. The flask is then removed from the ice bath and the mixture is stirred at room temperature for twelve hours. A yield of 97 percent of desired carbamate is obtained as a solid melting at 81° C.–83° C. Recrystallization from the benzene-hexane mixture yields N-methyl carbamate of 2-oximino-1,3-dithiolane melting at 82.2° C.–83.4° C. Upon analysis, the following data is obtained. Calculated for $C_5H_8N_2O_2S_2$ in percent: C, 31.2; H, 4.2; S, 33.4. Found: C, 31.4; H, 4.4; S, 33.3.

Substituting n-hexyl isocyanate (6.08 parts) for the methyl isocyanate above, N-hexyl carbamate of 2-oximino-1,3-dithiolane is obtained in 93 percent yield.

EXAMPLE 16

*Preparation of N-ethyl carbamate of 2-oximino-1,3-dithiolane*

To a suitable ice-cooled reaction vessel are added 5.0 parts of 2-oximino-1,3-dithiolane in 20 parts (by volume) of dry ether and 2.6 parts (by volume) of ethylisocyanate and 0.1 part of triethylamine. The contents of the flask are then stirred for twenty-four hours at room temperature. After stripping off ether, the ethyl carbamate product is collected as an oil which crystallizes on seeding. Recrystallization from benzene-petroleum ether yields 55 percent of the N-ethyl carbamate product having a melting point of 51.0° C.–52.5° C. and analyzes in percent as follows.

Calculated for $C_6H_{10}N_2O_2S_2$: C, 34.9; H, 4.9; S, 31.1. Found: C, 35.1; H, 4.8; S, 31.2.

EXAMPLE 17

*Preparation of N,N-dimethyl-carbamate of 2-oximino-1,3-dithiolane*

To a suitable reaction vessel are added 7.0 parts of the sodium salt of 2-oximino-1,3-dithiolane in 50 parts (by volume) of dry acetone and 4.7 parts of dimethyl carbamyl chloride. After refluxing the mixture for three hours, an equal volume of water is added and the dimethyl carbamate product is extracted with a 50–50 ether-benzene mixture. Recrystallization from a methanol-water mixture yields 58 percent of the desired product having a melting point of 94.2° C.–95.0° C. and analyzes in percent as follows.

Calculated for $C_6H_{10}N_2O_2S_2$: C, 34.9; H, 4.9; S, 31.1. Found: C, 35.2; H, 4.9; S, 31.2.

EXAMPLE 18

*Preparation of the carbamate of 2-oximino-1,3-dithiolane*

Into an ice-cooled reaction vessel equipped with an ice-cooled condenser and containing 75 parts (by volume) of dry ether are added 18.9 parts of phosgene. To this mixture is next introduced in increments a total of 10.0 parts of the sodium salt of 2-oximino-1,3-dithiolane over a thirty-minute period. After stirring the mixture at room temperature for about fifteen hours, excess phosgene is removed by distillation. The remaining mixture is ice-cooled. The latter is then added to a solution of 2.2 parts of ammonia in 100 parts (by volume) of dry acetonitrile. After removing the ice bath to allow the mixture to come to room temperature, the mixture is filtered and the filtrate stripped of solvent. The solid residue is extracted in a Soxhlet apparatus with petroleum ether to remove impurities, such as unreacted chloro-carbonate intermediate. These solids together with those obtained after removal of inorganic salts from the original filter cake with water, amount to 9.1 parts, or 80 percent of theory, of the carbamate of 2-oximino-1,3-dithiolane having a melting point equal to 130° C.–132° C. After recrystallization from the chloroform hexane mixture, the product melts at 133° C.–135° C. and analyzes in percent as follows.

Calculated for $C_4H_6N_2O_2S_2$: C, 27.1; H, 3.4; N, 15.7; S, 36.0. Found: C, 27.2; H, 3.6; N, 15.9; S, 35.8.

EXAMPLE 19

*Preparation of the N-methyl carbamate of 2-oximino-1,3-oxathiolane*

A mixture of 1.67 parts of 2-oximino-1,3-oxathiolane, 0.90 part (by volume) of methyl isocyanate and a trace of triethylamine in 10 parts of dry ether is allowed to stand for two days. Evaporation of the ether and recrystallization of the residue from an isopropanol-hexane mixture gives 1.43 parts, or 57.8 percent of theory, of the carbamate having a melting point of 88.2° C.–90.2° C. A second recrystallization renders a product melting at 89.6° C.–90.8° C.

Calculated for $C_5H_8N_2O_3S$: C, 34.07; H, 4.58; N, 15.90; S, 18.20. Found: C, 34.40; H, 4.94; N, 16.05; S, 18.37.

EXAMPLE 20

*Preparation of the N-methyl carbamate of 4-methyl-2-oximino-1,3-dithiolane*

A mixture of 91.1 parts of 4-methyl-2-oximino-1,3-dithiolane, 3.7 parts (by volume) of methyl isocyanate and 0.3 part of triethylamine in 75 parts of dry ether is stirred and allowed to stand overnight. Evaporation of the ether renders a crude oil product. The major portion of crude material is purified by molecular distillation to give 8.6 parts, or 68 percent of theory of the pure product.

Calculated for $C_6H_{10}N_2O_2S_2$: C, 34.93; H, 4.89; N, 13.58; S, 31.09. Found: C, 34.91; H, 5.18; N, 13.81; S, 30.99.

EXAMPLE 21

*Preparation of the N-methyl carbamate of 2-oximino-1,3-dithiane*

To an ice-cooled mixture of 6.0 parts of 2-oximino-1,3-dithiane and 0.2 part of triethylamine in 25 parts of dry ether are added 2.5 parts (by volume) of methylisocyanate. After coming to room temperature, the mixture is refluxed for four hours. Sufficient chloroform is added to dissolve the oil which formed and the mixture is washed with dilute sodium hydroxide solution and water and dried. Stripping off the solvent leaves 6.0 parts, or 72 percent of theory, of product as an oil which is induced to crystallize and melts at 89° C–92° C. Recrystallization from a benzene-hexane mixture yields short colorless needles having a melting point of 92.8° C.–93.8° C.

Calculated for $C_6H_{10}N_2O_2S_2$: C, 34.93; H, 4.86; S, 31.09. Found: C, 35.29; H, 5.26; S, 31.08.

EXAMPLE 22

*Preparation of the N-methyl carbamate of 4-methyl-2-oximino-1,3-oxathiolane*

The procedure described in Example 15 is followed in every detail employing 5-methyl-2-oximino-1,3-oxathiolane hydrochloride instead of 2-oximino-1,3-dithiolane and chloroform instead of ether as solvent. The solid N-methylcarbamate of 5-methyl-2-oximino-1,3-oxathiolane melting at 95° C–98° C. is obtained in 92 percent yield after recrystallization from benzene-hexane. Resultant carbamate analyzes as follows.

Calculated for $C_6H_{10}N_2O_3S$: C, 39.09; H, 4.80; N, 14.86; S, 14.86; S, 16.95. Found: C, 38.01; H, 5.32; N, 14.80; S, 16.85.

EXAMPLE 23

*Preparation of the N-methyl carbamate of 4-n-butyl-2-oximino-1,3-dithiolane*

The procedure described in Example 15 is followed employing 4-n-butyl-2-oximino-1,3-dithiolane instead of 2-oximino-1,3-dithiolane. The N-methyl carbamate of 4-n-butyl-2-oximino-1,3-dithiolane is obtained in 73 percent yield as a solid melting at 75° C.–78° C. after recrystalllization from ether-petroleum ether. On analysis, the following data is further obtained.

Calculated for $C_9H_{16}N_2O_2S_2$: C, 43.69; H, 6.11; N, 11.33; S, 25.92. Found: C, 43.69; H, 6.06; N, 11.42; S, 26.10.

The carbamate compounds of the present invention may be applied alone to the soil, or they may be formulated on granules for application with a conventional fertilizer spreader, as an emulsifiable concentrate or a wettable powder for application, as dilute sprays, as a dust for application with a conventional duster, or adsorbed on activated carbon for application on seeds.

It is an advantage of the present invention that the nematocidal compounds characterized above are effective when employed in dilute concentrations. It is preferred, therefore, to incorporate the compounds in a variety of suitable solid or liquid carriers or diluents. Such compositions can be prepared either as a suspension in a suitable non-solvent or as a dust. A suspension or dispersion of the nematocidal compound in a non-solvent such as water, may be prepared for direct application to infested soil. Alternatively, a prepared suspension of the compound may be modified by the addition thereto of small amounts, usually from about one to about five parts, of a commercially available dispersing or surface active agent per one-hundred parts of the nematocidal compound. Examples of surface active compounds are: the sodium salt of polymerized propyl naphthylene sulfonic acid, an alkyl aryl polyether alcohol, and a modified phthalic glycerol alkyd resin.

In the preparation of dusts, the nematocidal compound may be admixed with a finely divided inert granular material as a carrier in any conventional manner. Useful carriers include kaolin, bentonite, talc, pumice, silica, chalk, wood flour, fuller's earth, activated carbon, charcoal, and the like.

The following examples further illustrate the invention but are not to be construed as limiting the same.

EXAMPLE 24

Four ml. aliquots of the hereinbelow recited carbamates in water at concentrations of 0.1, 0.01, and 0.001 percent are placed in vials. To each vial are added 100 Anguillula nematodes. The vials are rotated for twenty hours and thereafter mortality counts are recorded as shown in Table I.

TABLE I

| Compound | Percent Kill of Nematodes | | |
|---|---|---|---|
| | 0.1% | 0.01% | 0.001% |
| N-Methyl Carbamate of 2-Oximino-1,3-Dithiolane | 100 | 100 | 100 |
| N-Ethyl Carbamate of 2-Oximino-1,3-Dithiolane | 100 | 100 | 0 |
| N,N-Dimethyl Carbamate of 2-Oximino-1,3-Dithiolane | 90 | 0 | |
| Carbamate of 2-Oximino-1,3-Dithiolane | 75 | | |
| N-Methyl Carbamate of 4-methyl-2-Oximino-1,3-Dithiolane | 100 | 100 | 0 |
| N-Methyl Carbamate of 2-Oximino-1,3-Dithiane | 100 | 100 | 75 |
| N-Methyl Carbamate of 2-Oximino-1,3-Oxathiolane | 100 | 75 | |
| N-Methyl Carbamate of 5-Methyl-2-Oximino-1,3-Oxathiolane | 100 | 50 | |
| N-Methyl Carbamate of 4-n-Butyl-2-Oximino-1,3-Dithiolane | 100 | 95 | |

EXAMPLE 25

Several carbamates are mixed thoroughly into soil either as a granular formulation or in an aqueous carrier at rates not exceeding fifty pounds of active ingredient per acre. After the compounds are mixed in the soil, an aliquot of root-knot nematode larvae, eggs and galled root tissue is added. The treated infested soils are then put into suitable containers maintained at 80° F. After seven days, one seedling tomato plant is placed in each container. After standing for a period of twenty-one days, the tomato plant roots are washed free of soil and rated according to the root-knot nematode galling present. The following gall index is employed:

0=complete absence of galls,
1=1 to 10 galls,
2=severe galling.

The results are recorded as shown in Table II below.

TABLE II

| Compound | Dosage, Pounds per Acre | Root-Knot Index Replication | |
|---|---|---|---|
| | | I | II |
| N-Methyl Carbamate of 2-Oximino-1,3-Dithiolane | 50 | 0 | 0 |
| | 25 | 0 | 0 |
| | 10 | 2 | 2 |
| N-Ethyl Carbamate of 2-Oximino-1,3-Dithiolane | 50 | 0 | 0 |
| | 25 | 0 | 0 |
| | 10 | 2 | 2 |
| N,N-Dimethyl Carbamate of 2-Oximino-1,3-Dithiolane | 50 | 0 | 0 |
| | 25 | 2 | 2 |
| | | 0 | 0 |
| N-Methyl Carbamate of 4-Methyl 2-Oximino-1,3-Dithiolane | 50 | 0 | 0 |
| | 25 | 0 | 0 |
| | 10 | 0 | 0 |
| | 5 | 0 | 0 |
| | 2.5 | 1 | 1 |
| N-Methyl Carbamate of 2-Oximino-1,3-Oxathiolane | 50 | 0 | 0 |
| | 25 | 0 | 0 |
| | 10 | 0 | 0 |
| | 5 | 0 | 0 |
| | 2.5 | 1 | 1 |

EXAMPLE 26

A measured amount of the compound, dissolved in a liquid carrier, is injected into the center of root-knot nematode (Meloidogyne species) infested soil in one-quartz glazed crocks. Wetting of the soil surface provided a water seal. A tomato seedling is planted seven days later. Each treatment is duplicated. Twenty-one days after planting, the tomato plant is removed and examined for root-knot nematode gall development. The results are expressed as degree of root galling and recorded in Table III below:

TABLE III

| Compound | Dosage, Pounds per Acre | Root-Knot Index Replication | |
|---|---|---|---|
| | | I | II |
| N-Methyl Carbamate of 2-Oximino-1,3-Oxathiolane | 50 | 0 | 0 |
| | 25 | 0 | 0 |
| | 10 | 0 | 0 |
| | 5 | 0 | 0 |
| | 2.5 | 1 | 1 |

As noted above, the nematocidal compounds may be effectively applied to soils in various ways, such as a dust for application with a conventional duster, as an emulsion for application with sprayers, on granules for application with a conventional fertilizer spreader, or adsorbed on activated carbon for application to seeds. Whatever the method of application, a good practice is to apply the carbamate compounds at concentrations varying from one to fifty pounds per acre for the effective control of nematodes and other parasitic worm life.

We claim:

1. A method for controlling nematodes which comprises: applying thereto a carbamate compound having the formula:

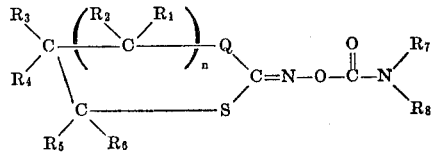

wherein $R_1$, $R_2$, $R_3$, $R_4$, $R_5$, $R_6$, $R_7$ and $R_8$ are radicals selected from the class consisting of hydrogen and lower alkyl, $n$ is an integer from 0 to 1, and Q is an atom selected from the group consisting of oxygen and sulfur.

2. A method as defined in claim 1, in which the compound is N-methyl carbamate of 2-oximino-1,3-dithiolane.

3. A method as defined in claim 1, in which the compound is N-ethyl carbamate of 2-oximino-1,3-dithiolane.

4. A method as defined in claim 1, in which the compound is N,N-dimethyl carbamate of 2-oximino-1,3-dithiolane.

5. A method as defined in claim 1, in which the compound is the carbamate of 2-oximino-1,3-dithiolane.

6. A method as defined in claim 1, in which the compound is N-methyl carbamate of 2-oximino-1,3-oxathiolane.

No references cited.

JULIAN S. LEVITT, *Primary Examiner.*

LEWIS GOTTS, *Examiner.*

UNITED STATES PATENT OFFICE
CERTIFICATE OF CORRECTION

Patent No. 3,183,148                            May 11, 1965

Donald S. Cannon et al.

It is hereby certified that error appears in the above numbered patent requiring correction and that the said Letters Patent should read as corrected, below.

Column 8, lines 26 and 27, for "Calculated for $C_6H_{10}N_2O_3S$: C, 39.09; H, 4.80; N, 14.86; S, 14.86; S, 16.95." read -- Calculated for $C_6H_{10}N_2O_3S$: C, 38.09; H, 4.80; N, 14.86; S, 16.95. --.

Signed and sealed this 21st day of September 1965.

(SEAL)
Attest:

ERNEST W. SWIDER
Attesting Officer

EDWARD J. BRENNER
Commissioner of Patents